United States Patent

Pocaterra

[15] 3,646,822
[45] Mar. 7, 1972

[54] MECHANICAL TRANSMISSION SYSTEM

[72] Inventor: Luis Alberto Pocaterra, 845 Boylston St., Boston, Mass. 02116

[22] Filed: Apr. 30, 1969

[21] Appl. No.: 820,443

[52] U.S. Cl. ................................................74/53, 74/57
[51] Int. Cl. ................................F16h 25/08, F16h 25/12
[58] Field of Search...........................74/53, 57, 29, 35, 41

[56] References Cited

UNITED STATES PATENTS

| | | | |
|---|---|---|---|
| 2,958,237 | 11/1960 | Johnson | 74/41 |
| 399,188 | 3/1889 | Dieter | 74/35 |
| 608,223 | 8/1898 | Reeves et al. | 74/35 |
| 2,052,911 | 9/1936 | Weathers | 74/29 |
| 2,084,645 | 6/1937 | Kliewer | 74/29 |
| 2,121,831 | 6/1938 | Simmons | 74/57 |
| 2,441,596 | 5/1948 | Reitter | 74/57 |
| 2,548,807 | 4/1951 | Morgan et al. | 74/41 |
| 3,388,603 | 6/1968 | Clark | 74/57 |

*Primary Examiner*—William F. O'Dea
*Assistant Examiner*—Wesley S. Ratliff, Jr.
*Attorney*—Thomas C. Stover, Jr.

[57] ABSTRACT

A mechanical power transmission system is provided for machines including vehicles wherein a power source, e.g., a gear or a shaft transmits power to a receiver such as wheels by way of an oscillating transmission member. The oscillatory path of the transmission member is varied to change the power-speed ratio applied to the receiver.

18 Claims, 13 Drawing Figures

FIG. 3A

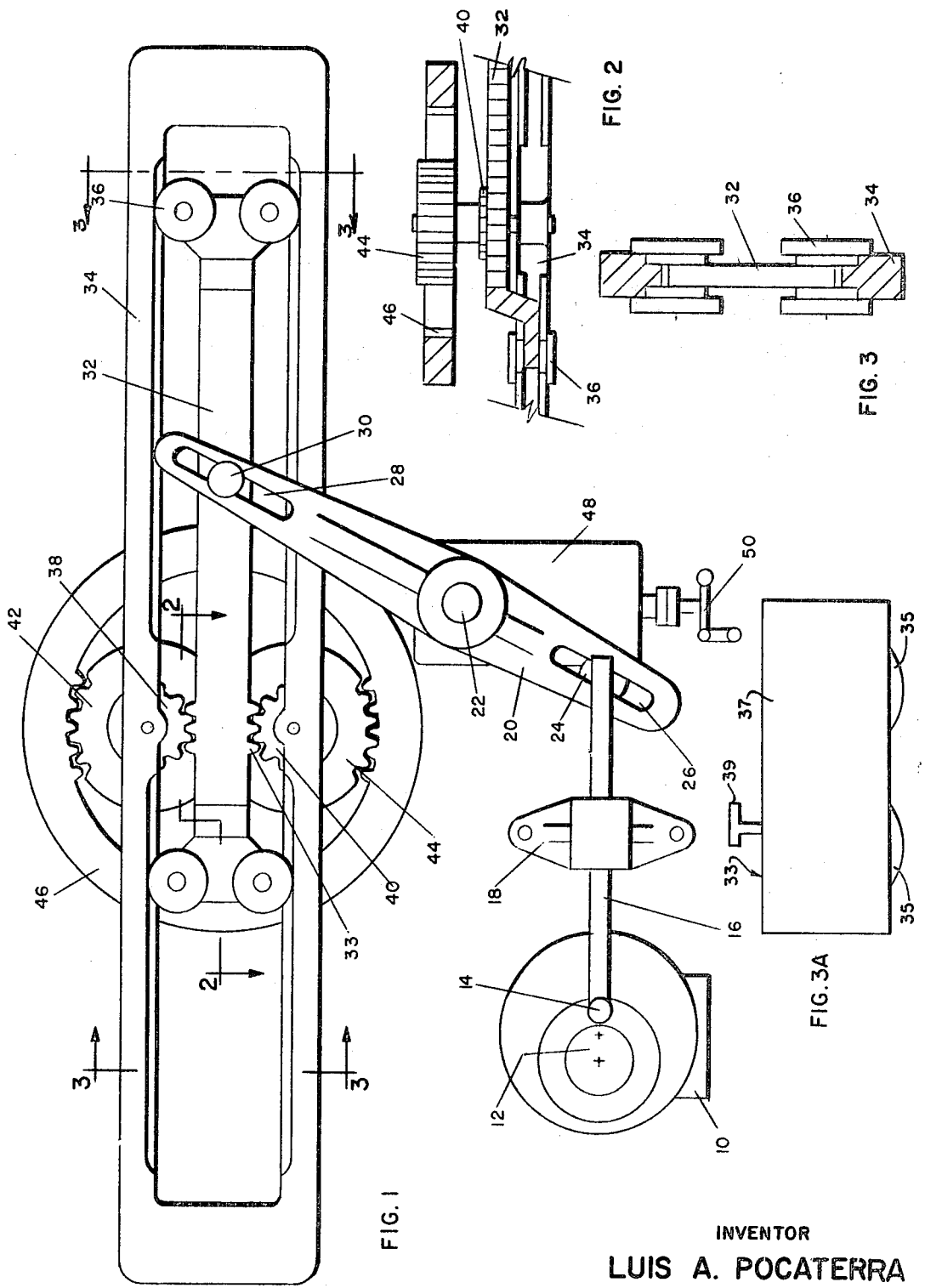

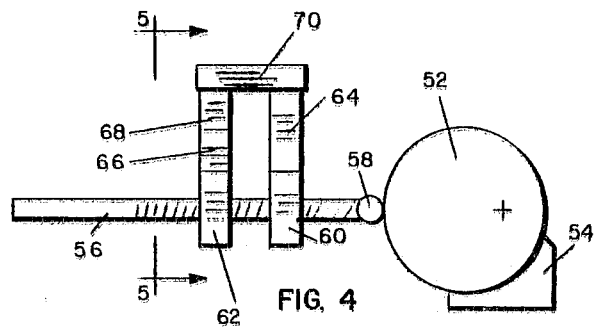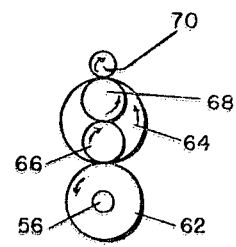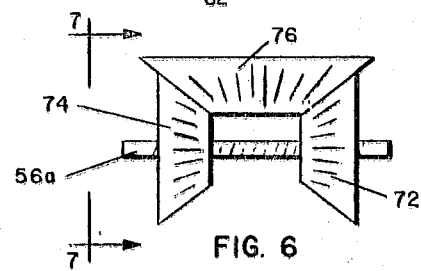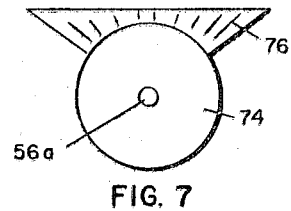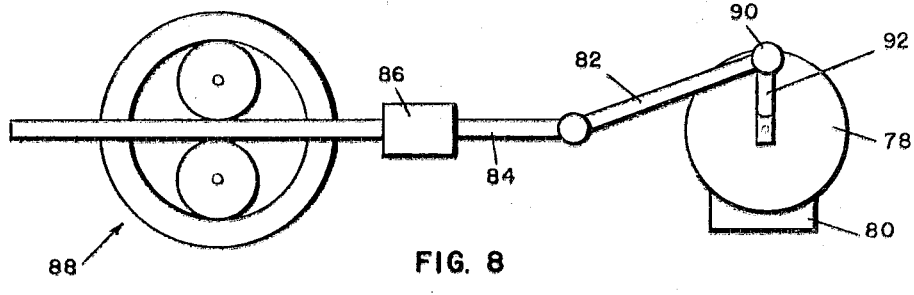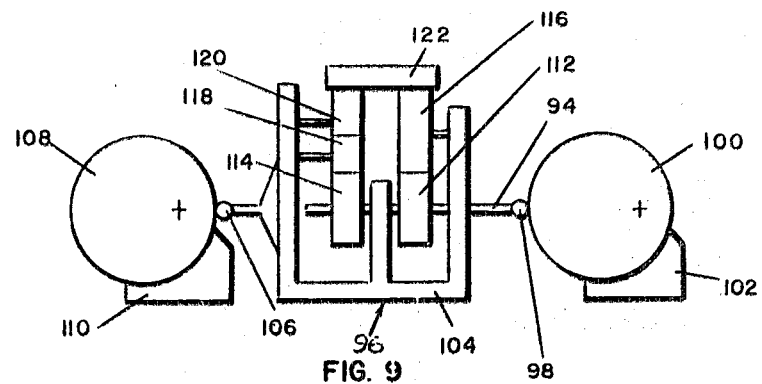

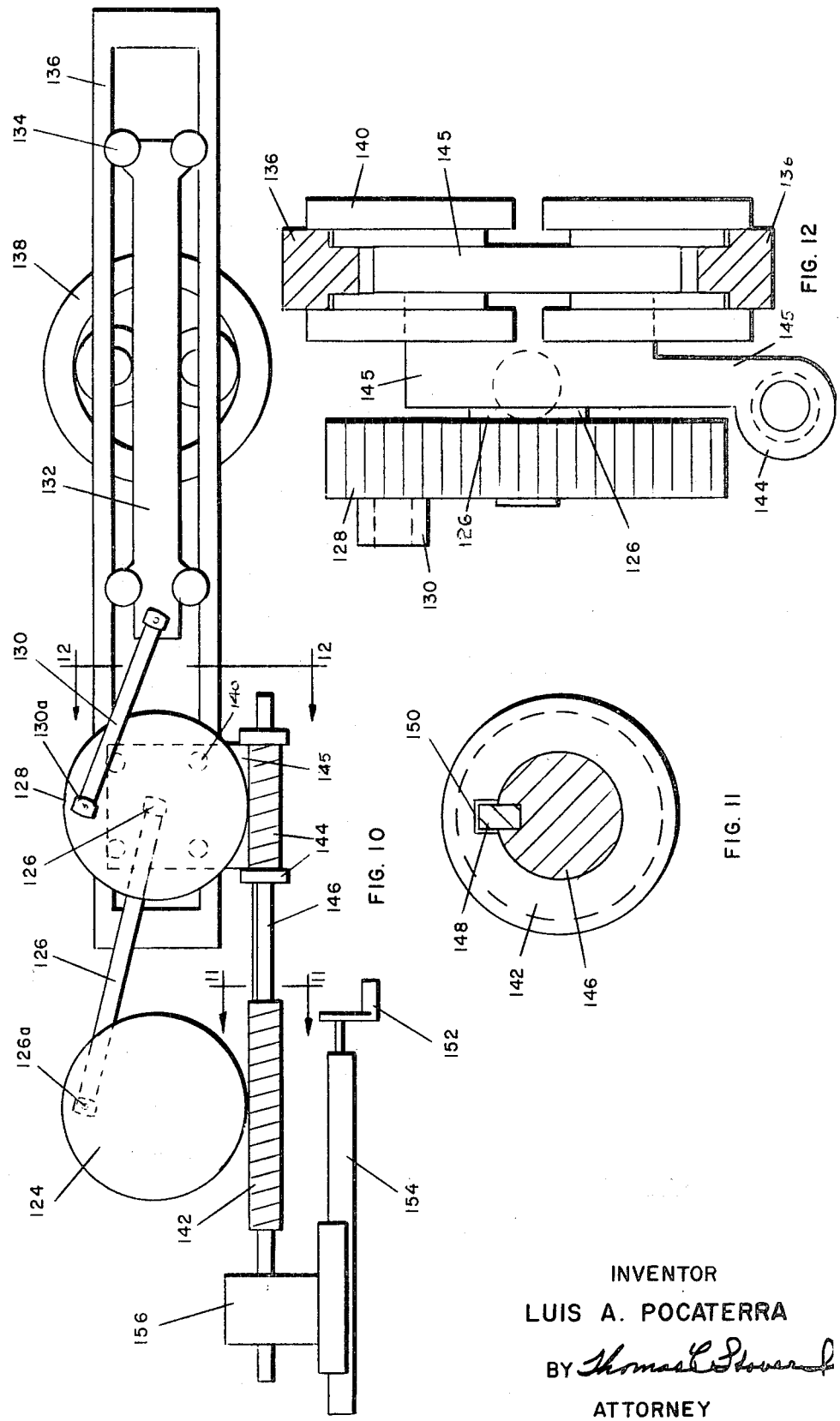

MECHANICAL TRANSMISSION SYSTEM

FIELD OF THE INVENTION

This invention relates to a power transmission system, particularly a mechanical, multispeed power transmission system.

THE PRIOR ART

Various power transmission systems have been developed over the years to serve the many power systems in use today. Transmission for machinery and vehicles, especially the automobile are well known. Taking the motor vehicle as an illustration of highly developed power transmissions, especially multispeed transmissions, there can be listed several well-known and distinct types. In particular, there are the standard and automatic transmissions as follows: The standard transmission, as is well known, is a manual shift of typically three or four forward gears or speeds and one reverse gear or speed. This transmission system is generally a positive metal to metal system with set gear or power ratios, and these power ratios are, as indicated, limited in number. There are no in-between power ratios; at a certain r.p.m. or speed of engine one should shift from one gear to another. Moreover, shifting is stepwise and cumbersome; the power source and transmission are disengaged while shifting from gear to gear.

The typical automatic vehicle transmission is quite similar to the above stepwise standard transmission except the shifting from gear to gear is done by automatic means. Again there are set gear or power ratios with no in-between and power source and transmission are disengaged while shifting.

Another automatic transmission system, less widely used than the above is a mechanical and hydraulic transmission system which is more fluid in shifting from speed to speed as opposed to the above stepwise systems. However, it is not a positive metal to metal transmission system due to the intervening hydraulic liquid in the system. Accordingly, while the liquid contributes to smooth shifting, it also is a source of power dissipation and slippage between the nonconnecting metal components. Because of this inefficiency the hydraulic transmission system has fallen into comparative disuse.

In sum, there has heretofore been no transmission system that obviates the above shortcomings.

Accordingly, there has now been discovered a positive metal to metal transmission system which can be shifted to an infinite number of power-speed ratios in a smooth fluid manner, without disengaging the system.

SUMMARY

Broadly, this invention provides a mechanical power transmission system comprising a transmission member, a mechanical power source for oscillating the member, a power receiving component connected to the transmission member and means for shifting the oscillatory path described by the member relative to the component to vary the power ratio applied to the component. Also provided is a method for transmitting mechanical power at various power-speed ratios wherein an oscillating member drives a second member comprising shifting the oscillatory path described by the oscillating member relative to the second member to vary the power-speed ratios applied to the second member.

In one particular this invention provides a system wherein a plurality of overriding clutch gears convert oscillatory motion from a shaft to continuous rotary motion applied to a power receiving component.

DESCRIPTION

The invention will become more apparent from the following detailed specification and drawings in which:

FIG. 1 is an elevation view of a mechanical power transmission system embodying the present invention;

FIG. 2 is a sectional elevation view of the embodiment of FIG. 1 taken on line 2—2, looking in the direction of the arrows;

FIG. 3 is a sectional elevation view of the embodiment shown in FIG. 1 taken on line 3—3, looking in the direction of the arrows;

FIG. 3A is an elevation view of a vehicle embodying the present invention;

FIG. 4 is an elevation view of another embodiment of a mechanical power transmission system of the present invention;

FIG. 5 is a sectional elevation view of the embodiment of FIG. 4 taken on line 5—5, looking in the direction of the arrows;

FIG. 6 is a sectional elevation view of a further embodiment of a mechanical power transmission system of the present invention;

FIG. 7 is a sectional elevation view of the embodiment of FIG. 6 taken on line 7—7 looking in the direction of the arrows;

FIG. 8 is an elevation view of another embodiment of a mechanical power transmission system of the invention;

FIG. 9 is an elevation view of a further embodiment of a mechanical power transmission system of the invention;

FIG. 10 is an elevation view of another embodiment of a mechanical power transmission system of the invention;

FIG. 11 is a sectional elevation view of the embodiment of FIG. 10 taken on line 11—11 looking in the direction of the arrows; and FIG. 12 is a sectional elevation view of the embodiment of FIG. 11 taken on line 12—12 looking in the direction of the arrows.

Referring now to the drawings, power source 10, having rotatable eccentric cam 12 serves to oscillate cam follower 14 and associated drive rod 16 through stationary bushing 18 to push and pull the lower end of fulcrum arm 20 about fulcrum axis 22 as shown in FIG. 1. The drive rod 16 engages fulcrum arm 20 by way of roller bearing 24 attached to said rod through slot 26 in said arm.

The upper end of fulcrum arm 20 is attached to threaded drive shaft 32 by way of roller bearing 30 attached to said shaft through slot 28 in said arm as shown in FIG. 1. The drive shaft 32, when activated by the fulcrum arm 20 rides backward and forward along track 34 guided by roller bearings 36 mounted on said shaft as illustrated in FIGS. 1 and 3.

Mounted on the track 34 are overriding clutch gears 38 and 40 which engage the threads 33 of drive shaft 32 and which are rotatably connected respectively to drive gears 42 and 44, said drive gears both engaging rotatable ring gear 46 as shown in FIGS. 1 and 2. In operation the power source 10 and drive rod 16 pushes the lower end of the fulcrum arm forward pushing the drive shaft rearward. During the rear stroke of the shaft 32, clutch gear 38 and connected drive gear 42 are driven clockwise, driving the ring gear, while clutch gear 40 and drive gear 44 idle. In the second half of the cycle, power source 10 and drive rod 16 pull the lower end of the fulcrum arm rearward and the drive shaft forward. During the forward stroke of the shaft 32, clutch gear 40 and drive gear 44 are driven clockwise, driving the ring gear, while clutch gear 38 and drive gear 42 idle. The ring gear is thus continually driven clockwise during the cycle except during the fractional time the drive shaft reverses direction; then the ring gear coasts or idles.

The fulcrum arm 20 is, as previously indicated, pivotably mounted at fulcrum axis 20 to support column 48. Shifting means 50 serve to raise and lower support column 48 and thus the fulcrum arm 20 with respect to drive rod 16 and drive shaft 32, changing the effective axial distance and moment of force applied at each end of said fulcrum arm. Horizontal shifting means (not shown) also serve to move shifting means 50, support column 48 and fulcrum arm 20, left or right. These two shifting means can be used singly or in combination as desired. In this manner the speed of the drive shaft can be reduced and the torque increased by raising the fulcrum arm 20. Similarly, the speed of the drive shaft can be increased and the applied torque reduced by lowering the fulcrum arm.

A vehicle incorporating the power transmission system of FIG. 1, 2 and 3 is shown in FIG. 3A, wherein vehicle 33 having wheels 35, body 37 and steering handle 39 is shown. Each of the wheels 35 corresponds to the rotatable ring gear 46 of the transmissions system of FIG. 1.

Other embodiments of the invention are provided herein. Thus, as shown in FIGS. 4 and 5, cam 52, driven by power source 54, oscillates threaded shaft 56 via cam follower 58, through ring gears 60 and 62. The gears 60 and 62 are overriding gears, helically threaded so that gear 60 is driven on the forward stroke of the shaft 56, gear 62 idling and gear 62 is driven on the backward stroke of the shaft 56, gear 60 idling. The ring gears 60 and 62 are connected respectively to intermediate gears 66, 68 and 64 so that gears 64 and 68 are driven in turn, in the same direction and drive cylindrical gear 70 continuously in one direction as shown in FIGS. 4 and 5. The shaft 56 is threaded at gradually increasing or decreasing angles of pitch along its length. Displacement means (not shown) longitudinally shift the shaft or shift the above-described gear assembly, so that the ring gears 60 and 62 are situated and powered by another portion of the drive shaft 56, thus varying the power speed ratio applied to the gear assembly, including gear 70.

Another embodiment of the above gear assembly, which converts oscillatory motion to rotational motion is shown in FIG. 6 and 7 wherein overriding clutch gears 72 and 74, on threaded shaft 56a engage ring gear 76. Gear 72 drives ring gear 76 on the forward stroke of shaft 56a and gear 74 drives said ring gear on the backward stroke of said shaft.

In another embodiment wheel 78, turned by power source 80, oscillates shaft extension 82 and threaded shaft 84 as shown in FIG. 8. The shaft 84, guided by bushing 86 drives the ring gear-overriding clutch assembly 88. The gear assembly 88, shown in schematic in FIG. 8 is similar to that shown in FIGS. 1 and 2, e.g., gears 38, 40, 42, 44 and 46. In this embodiment the shaft extension 82 is connected to wheel 78 by bearing 90 at wheel slot 92. The power-speed ratio applied to the gear assembly 88 is varied by changing path or amplitude, of threaded shaft 84. This is done by changing the position of the shaft extension 82 on the wheel 78, i.e., by shifting bearing 90 along the wheel slot 92.

In addition to changing the path of a drive shaft to change the power-speed ratio transmitted in the present invention, the power receiving member can also be shifted relative to the shaft or both can be shifted. Accordingly, drive shaft 94 having threads of varying pitch is oscillated through gear assembly 96 via cam follower 98, cam 100 and power source 102 as shown in FIG. 9. Gear assembly 96 is connected by way of gear frame 104 and is oscillated via cam follower 106, cam 108 and power source 110. Gear assembly 96 has drive gears 112 and 114, intermediate gears 116, 118 and 120 which drive cylindrical gear 122 as shown in FIG. 9. Drive gears 112 and 114 have threaded cores or interior surfaces and override the shaft 94 in opposite directions similar to the drive gears 62 and 60 shown in FIG. 4. In operation, both cams can turn in phase or at various degrees out of phase oscillating respectively shaft 94 and gear assembly 96 in phase, 180° out of phase or at various degrees between. The shaft 94 can be stopped while the gear assembly 96 oscillates or vice versa or both can oscillate together in various phases as indicated above; in each case a different power-speed ratio applied to the cylindrical gear 122 will be realized. When the respective cams are exactly in phase the shaft 94 and gear assembly 96 will oscillate together but not in respect to each other and cylindrical gear 122 will stop; otherwise there will be relative oscillation and gear 122 will be driven. The power-speed ratio can also be changed by displacing the gear assembly 96 and cam 108 to a new portion of shaft 94 or by moving the shaft 94 and its cam 100 relative to said gear assembly.

In still another embodiment of the present invention, drive gear 124 is connected by drive rod 126 to the axis of drive gear 128, which in turn is connected by shaft extension 130 to threaded drive shaft 132 as shown in FIGS. 10 and 12. Drive shaft 132 rides via roller bearings 134 on track 136 and is in threaded engagement with gear assembly 138 as shown in FIG. 10. Drive gear 128 also rides on track 136 by way of roller bearings 140 shown in FIGS. 10 and 12. Drive gear 124 is driven by worm gear 142 and drive gear 128 is driven by worm gear 144 as shown in FIG. 10. In this embodiment the shaft 146 of worm gear 144 is mounted coaxially within worm gear 142 as shown on FIGS. 10 and 11. Worm gear 144 is supported by support fork 145. Worm gear shaft 146 has a ridge 148 which fits with clearance into longitudinal groove 150 situated in an interior wall of worm gear 142 as shown in FIGS. 10 and 11. Because of this ridge and groove arrangement, worm gear 142, when rotated, rotates shaft 146 and worm gear 144 at the same r.p.m. while permitting worm gear 144 to slide back and forth longitudinally with respect to worm gear 142. Worm gear 142 is moved longitudinally back and forth by way of crank 152, helically threaded shaft 154 and T-block 156 connected thereto, which serves to rotate first drive gear 124 with respect to second drive gear 128. Drive means (not shown) rotate worm gears 142 and 144.

In operation, worm gears 142 and 144 are axially rotated rotating drive gears 124 and 128. Drive gear 124 is axially fixed and on rotation causes drive gear 128 and worm gear 144 to oscillate back and forth as guided by the track 136. Since drive gear 128 is also rotating, it subjects shaft extension 136 and threaded drive shaft 132 to two component oscillation, driving gear assembly 138 accordingly. As shown in FIG. 10, the drive gears 124 and 128 are in phase, the components of oscillation cumulative and drive shaft 132 oscillates at maximum amplitude and speed. However, by turning crank 152, worm gear 142 is moved, rotating drive gear 124 and drive rod connection point 126a out of phase with drive gear 128 and shaft extension point 130a. If point 126a is moved 180° out of phase with point 130a, then with worm gears 142 and 144 rotating, the oscillation components subtract and tend to cancel, imparting a minimum or zero oscillation to drive shaft 132. Various degrees of out of phase positioning of the drive gears 124 and 128 will result in varying oscillation of drive shaft 132, driving gear assembly 10 at correspondingly different speed-power ratios. Thus, crank 152 is turned to shift the speed-power ratio of this embodiment.

FIGS. 10 and 12 show drive gears of equal diameter. However, different size drive gears can be employed if desired. Various other power sources such as mentioned previously can rotate said drive gears in place of the worm gears shown. Said drive gears can be rotated at the same or different speeds. The drive gears, moreover, can be replaced by discs, wheels, rotatable levers or other rotatable bodies where desired. The drive shaft 32 can have constant or various thread pitch. The gear assembly 138 can be replaced by the various gear assemblies disclosed herein.

The apparatus of FIG. 10 is a means of transmitting power similar to the apparatus of FIG. 1. However, the fulcrum arm 20, FIG. 1, is replaced by the two gears 124 and 128 of FIG. 10.

From the foregoing description it can be seen that the transmission system of the present invention is suitable for power transmissions in stationary machines as well as in all types of vehicles including toy vehicles. The vehicle contemplated can be virtually any type, suitable for travel on land, sea, or in any medium.

The transmission system of the invention is a positive metal to metal system. It does not require disengagement from the system to shift from one speed-power ratio to another. Rather than having a limited number of speeds or speed-power ratios, the present transmission system has an infinite number of said ratios. Because said system has an infinite number of speed-power ratios it always transmits power at maximum efficiency. Whereas the conventional limited transmission systems, i.e., the three- or four-speed systems, act at limited power-speed efficiency. For example, in going uphill in an automobile, second gear, while providing sufficient power for the ascent, may be too slow, i.e., cause the engine to turn over too fast for reasonable speed of the vehicle: while shifting to third gear sufficiently slows the engine r.p.m., the gear is not powerful enough for the ascent and the engine labors.

Accordingly, the power source can be any mechanical power device, such as gears, e.g., spur, helical and the like, wheels, including flywheels, pistons, cranks or other available power sources selected by the skilled practitioner.

The pivoting or fulcrum transmission member can take various shapes, e.g., oblong, angular, rounded, kidney shaped. Preferably, however, the member is an elongated fulcrum arm. As indicated heretofore, the fulcrum transmission member is connected to a power source at a connection point situated a distance from the axis or fulcrum of the member. The so-connected power source can thus act on the member to rock or pivot it back and forth. A power receiving member, such as a drive shaft, can also be connected to the transmission member at a second connection point, i.e., power takeoff point, situated on the other side of said axis, at a distance therefrom. It is, however, feasible to have both connection points located on the same side of said axis where desired. In any case, the distances from the respective connection points to the axis can be the same or different as desired.

There can be one or several power source connection points and one or several power takeoff connection points on the same transmission member or a combination thereof.

The power receiving member or members can be any type desired. FIGS. 1 to 9 show but a few examples of such members. Further, examples are a drive shaft threaded or smooth, a piston, a crank, a gear, a wheel or combination thereof. For a land vehicle the ultimate power receiving member is the wheels thereof.

As indicated in FIG. 1, a drive shaft driven backward and forward by the transmission member with the use of an overriding clutch system can drive a gear system continuously in one direction. Other conventional gear takeoff arrangements can be added to the present invention to provide a reverse direction speed for machines including vehicles.

An important feature of the present invention is the method provided of transmitting any number of power-speed ratios from power source to power receiver. The axis of the transmission member is shifted relative to the power source connection point to change the power and/or speed transmitted via said transmission member.

Under the basic principle applied to lever arms:

$$f_1, d_1 = f_2 d_2$$

where $d_1$ and $d_2$ are distances from points on a lever arm to the fulcrum thereof;

$f_1$, the force applied to the lever at $d_1$ and $f_2$ the resultant force at $d_2$.

Accordingly, looking at FIG. 1, moving axis 22 closer to power connection rod 16 results in an increased fulcrum distance to drive shaft 32, an increased stroke and speed applied to said shaft at concurrently reduced power or torque applied to said shaft. Moving axis 22 farther from connection rod 16 results in a shortened fulcrum distance to drive shaft 32 and a decreased stroke, speed and increased torque applied to said shaft.

Thus any number of speeds can be transmitted to a power receiving member; for example, vehicle wheels via a positive metal to metal transmission system in contrast to the three- or four-speed shift transmission systems currently in use. The transmission system of the invention is simpler with less moving parts and because it does not require shifting into and out of gear to change speeds, it is subject to less wear than conventional transmission systems.

The axis of the fulcrum transmission member can be shifted relative to the power source connection point and power takeoff connection point various ways. As shown in FIG. 1, the whole transmission member 20 can be moved relative to the above connection points. However, the transmission member could also be left in position and just the axis of said member raised or lowered. Alternatively, one or more of the connection points can be shifted. Preferably, however, the whole transmission member is shifted either mechanically, hydraulically, electrically or other convenient means.

The transmission member, when a threaded drive shaft, is a helically threaded elongated member having threads of various pitch as desired. Preferably the shaft has threads of gradually changing pitch. The threads can be inclined at any desired pitch for forward and reverse speeds.

As with the fulcum transmission member, the threaded transmission member can have several power source connection points and one or several power takeoff connection points or a combination thereof. For example, one threaded shaft can drive a plurality of gear assemblies such as shown in FIGS. 6 and 7.

The power source for the shaft can be, in addition to the cam assembly discussed, any desired power means, including a wheel, piston, cranks and the like.

The power receiving members for the threaded shaft can vary considerably. In addition to the ring gears, which are interiorly threaded to be driven on passage of the threaded drive shaft therethrough, gears can be situated in tangential contact with said shaft. The above ring gears or tangential gears can be in turn connected with gears or other power receiving source, wheels, pistons, cranks, a combination thereof and the like. The above ring or tangential gears are preferably overriding for reasons hereinbefore discussed. However, these gears need not be overriding and can be rotated back and forth by the shaft in accordance with the desired application. Further, overriding clutch gears can be connected to these gears where suitable. As before, a reverse gear arrangement can be added to the gear system or a portion of the drive shaft can be reverse threaded and the shaft shifted to reverse the direction of the associated gears.

Utilizing the overriding clutch principle of the present invention, other gear assemblies besides those shown in FIGS. 1, 4 and 6 can be provided. Thus, on FIG. 4 one ring gear can replace gears 60 and 64 and two gears replace 68 and 66 to continuously drive gear 70. Other gear systems can be devised within the scope of the present invention.

The threaded drive shaft of the invention advantageously has varying degrees of thread pitch along at least some of its length, including a reverse pitch thread portion. Thus, by shifting the threaded shaft longitudinally or the associated gear assembly along the shaft, the gear assembly is driven by a new portion of the oscillating shaft, and at a different power-speed ratio. Accordingly, the power-speed ratio applied to the gears or any power receiving component can be varied an infinite number, including the reverse direction as indicated above.

Another way to vary the power-speed ratio applied to a power receiving component is to vary the amount of oscillation applied to the shaft, as exemplified by the apparatus shown in FIG. 8. In addition, the shaft can be shifted relative to said component. Thus, the power-speed ratio applied can be varied at least two ways. Other combinations can be provided, e.g., the wheel 78 can be rotated at different speeds or the fulcrum arm 20 of FIG. 1 can replace the shaft extension 82 of FIG. 8.

As indicated in FIG. 9, the shaft can be shifted relative to the gear assembly or vice versa or both can shift and oscillate in or out of phase within the scope of the present invention.

As previously indicated, the transmission system of the invention is suitable for machines of all kinds, or components thereof, and vehicles of all kinds, including toys.

Accordingly, this transmission system can be made of various materials. Advantageously, the system is made of metals, e.g., the ferrous metals and alloys thereof or other metals, such as aluminum. However, other sturdy materials such as wood, plastic and the like can also be employed depending on durability and weight considerations.

What is claimed is:

1. A mechanical power transmission system comprising
   a transmission member,
   a mechanical power source for oscillating said member,
   a power receiving component connected to said transmission member at a pivot point and means for shifting said member and its oscillatory path relative to said pivot point to vary the power-speed ratio applied to said component.

2. The system of claim 1 wherein said transmission member is a fulcrum arm pivoted on an axis, said power source and said component being connected to said arm at separate points thereon and said fulcrum arm is shifted relative to said points.

3. The system of claim 1 wherein said transmission member is a threaded shaft having at least some threads of varying pitch therealong, said shaft being mounted to oscillate longitudinally, said component being a rotatably mounted threaded member, said shaft being in threaded engagement with said component, means to oscillate said shaft longitudinally to rotate said threaded member along a portion of said shaft and means to longitudinally shift said shaft relative to said threaded member for rotation along another portion of said shaft.

4. The system of claim 1 wherein said transmission member is in threaded engagement with a pair of drive gears, said member mounted to oscillate in forward and backward strokes, driving one drive gear on the forward stroke and the other drive gear on the rearward stroke, both drive gears being engaged with a third gear for driving the same.

5. The system of claim 4 wherein said transmission member is a threaded shaft passing through the axes of said drive gears in threaded engagement therewith, said shaft having threads of varying pitch.

6. The transmission system of claim 1 wherein a drive shaft is connected to said transmission member at a connection point located a distance from said axis and remote from said power source and means for (relatively moving said axis with respect to said connection points) shifting said connection point relative to said axis.

7. The transmission system of claim 6 incorporated into a vehicle wherein said drive shaft connects said transmission member with at least one wheel of said vehicle.

8. The transmission system of claim 6 wherein said drive shaft is moved forward and backward by said member and power source, said shaft is threaded and engages at least one gear for driving the same.

9. The transmission system of claim 6 wherein said drive shaft is threaded and engages a pair of drive gears driving one drive gear on the forward stroke and the other drive gear on the rearward stroke, both drive gears being engaged with a third gear for driving the same.

10. The transmission system of claim 6 wherein said transmission member is an oblong rod pivotably mounted on a fulcrum, said connection points being situated on said rod on opposite sides of said fulcrum.

11. The transmission system of claim 10 wherein said transmission member has a sizeable aperture at either end, each aperture extending along the longitudinal axis of said member, said power source being connected to said member via a roller bearing movable along one of said apertures, said drive shaft being connected to said member via a roller bearing movable along the other of said apertures and means for raising and lowering said member and thus said fulcrum relative to said power source and drive shaft.

12. A mechanical power transmission system comprising a threaded drive shaft, at least a pair of overriding drive gears, said shaft being in threaded engagement with said gears, said shaft mounted to oscillate in forward and backward strokes to drive one drive gear on the forward stroke and the other drive gear on the rearward stroke, both drive gears being engaged with at least one other gear for driving the same.

13. The system of claim 12 wherein said drive shaft passes through the axes of said drive gears in threaded engagement therewith.

14. The system of claim 12 wherein said drive shaft contacts the peripheries of said drive gears.

15. The system of claim 1 comprising a first rotatable body having a fixed axis,
a second rotatable body having a displaceable axis, said second body being connected by a rod from the axis thereof to a point on said first body removed from the axis thereof,
a drive shaft, said drive shaft being connected to said second rotatable body at a point removed from the axis thereof, means for rotating said first and second rotatable bodies causing said second rotatable body to move in an oscillatory path while rotating and impart oscillatory motion components to said shaft and means for rotating said first body independently of said second body to change the relative phases of rotation of said first and second bodies and change the oscillatory motion components applied to said shaft.

16. The apparatus of claim 15 wherein said rotatable bodies are gears.

17. The apparatus of claim 15 wherein said shaft is in threaded engagement with a gear assembly for driving the same.

18. A method for converting oscillatory motion to rotational motion wherein a shaft moves longitudinally backward and forward comprising contacting said shaft with at least two overriding drive gears, driving one gear on the forward stroke and one gear on the backward stroke and contacting both of said gears with a common gear, driving the common gear in one direction.

* * * * *